Dec. 12, 1933.                M. E. ROE                1,938,862
WHEEL
Filed Jan. 2, 1932

INVENTOR.
Mayo E. Roe.
BY
Slough and Canfield
ATTORNEY.

Patented Dec. 12, 1933

1,938,862

UNITED STATES PATENT OFFICE 1,938,862

WHEEL

Mayo E. Roe, Elyria, Ohio

Application January 2, 1932. Serial No. 584,333

5 Claims. (Cl. 301—97)

This invention relates to wheels and particularly to wheel rims.

My invention has numerous applications, but I have illustrated and described it herein as applied to a wheel generally of the rubber tired, wire spoked type.

It is an object of my invention to provide a wheel having an improved rim construction and which will be durable and strong in use and cheap to manufacture.

Another object is to provide, for wheels of the rubber tired, wire spoked type, an improved wheel rim.

Another object is to provide a wheel rim having improved means for associating and assembling it with wire spokes.

Another object is to provide an improved wheel rim which will be relatively resilient and which will resist the tendency to split and warp which have been inherent in prior wheels such, for example, as those in which the rims are constructed from wood.

Another object is to provide an improved wheel rim of the type comprising a rim proper sheathed with metal.

Other objects will be apparent to those skilled in the art to which my invention appertains.

My invention is fully disclosed in the following description taken in connection with the accompanying drawing, in which.

Figure 2:
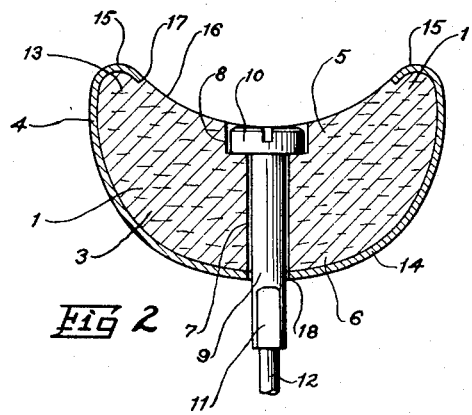
Fig. 2 is a cross-sectional view taken from the plane 2 of Fig. 1.

Referring to the drawing, I have shown generally at 1 the rim of a wheel embodying my invention, and at 2—2 spokes thereof such as the usual wire spoke.

The rim 1 comprises a rim portion proper, 3, and a metal sheath portion 4. The rim 3 is formed from a composition material to be more fully referred to, which I place in a mold and subject to pressure. The rim 3 is thus made in a single piece of annular form and of the cross-sectional shape of Fig. 2, comprising an outwardly concave annular portion 5 and an inwardly convex annular portion 6, the general shape of the cross-section being that of a crescent with blunt points.

This cross-sectional shape is purely optional and may be greatly varied, but has been chosen to illustrate my invention because it presents externally the conventional appearance as to form of wheel rims of this class. The material of the rim 3 may be formed in molds of various construction which will be understood by those skilled in this art and need not be further described here.

The mold is preferably provided with suitable core pieces whereby at spaced intervals around the rim, radial holes or bores 7 may be formed in the material of the rim 3 having circular counter-bores 8 in the surface of the concave portion 5, the size and shape of the bores 7 and 8 being such as to receive the shank 9 and head 10 of elongated nut elements 11 into which the threaded ends of the spokes 12 may be screwed.

The general construction comprising the threaded bolts and nut members 11 is well understood in this art in connection with wheels employing wood rims.

The rim proper 3, is covered on its convex portion 6 and on the horns or points 13 of the crescent form with a sheath of sheet metal, 4. While various methods may be employed to apply the sheath 4, preferably, I first form the sheath and place it in the mold and then fill the sheath in the mold with the composition material and mold it to shape in the sheath, the sheath thus forming a liner for a part of the mold.

Proceeding in this manner, the material of the rim 3 compactly and completely fills the sheath 4; and the sheath constitutes a support for the rim 3 while the latter is still in its unset condition, and there is no liability of damaging the rim 3 such as would obtain if the sheath 4 were applied to a pre-formed rim 3.

The sheath 4 besides having the externally convex portion 14 on the convex portion 6 of the rim, has reentrant bead portions 15 turned over the ends of the horn portions 13 and externally flush with the concave surface 16 of the concave portion 5 as at 17.

The concave surface 16 is suitably formed to receive and grip a rubber tire of usual construction. If it be desired to employ a pneumatic tire, a suitable bore corresponding to the bores 7 may be provided to accommodate the inflating valve stem.

I thus provide a wheel rim having the external appearance as to shape and dimension of the conventional wood rim; but comprising an outwardly radially concave annulus of metal in which is molded an outwardly concave annulus of composition material compactly filling the metal annulus and provided with molded bores in which wire spokes may be assembled in the manner usual with wood rims. In this connection, perforations 18 may be provided in the sheath 4 to accommodate the shank 9 of the spoke-receiving nut members 11.

A rim of this construction I find is not only more resilient and shock-absorbing than a rim made from wood, but is stronger and more durable, and not having grain in any direction, does not tend to warp and will not split in use; and can be manufactured at much less cost than, for example, the conventional wood rim.

Figure 3:
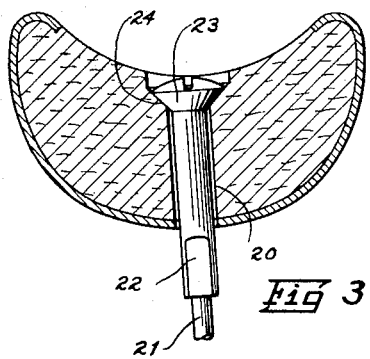
Figs. 3 and 4 are views similar to Fig. 2, illustrating modifications.

In the modification shown in Fig. 3, the bores 20 or alternate ones of the bores, may be inclined to the axis of the rim to accommodate spokes 21 and nut members 22 extending in the direction of the ends of relatively axially long hubs not shown; and the heads 23 of the nut members 22 may be generally conical on the under side thereof, and the bores 24 to receive the heads 23 may be correspondingly generally conical, whereby the heads 23 may fit the counter-bores 24 even if the spokes and nut members do not axially align accurately with the bores 20.

Figure 4:
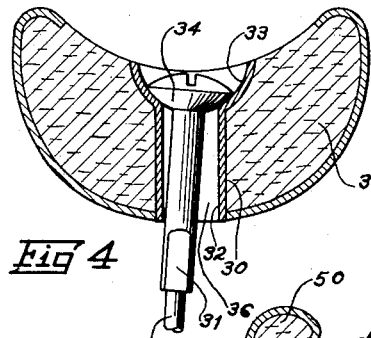

In the modification of Fig. 4, the bores 30 are made relatively large in diameter with respect to the diameter of the nut members 31 and/or lined with bushings 32 having at their outer ends generally spherical enlargements 33. The nut members 31 have heads 34 which, on their under sides, are generally spherical to the same radius as the spherical portions 33 of the bushings. With this arrangement, the bushings 32 may be disposed radially of the rim and alternate ones of the spokes 35 and nut members 31 may be inclined in opposite directions toward the ends of relatively long hubs. In Fig. 4, the nut member 31 is inclined toward the left, and as will be observed, the clearance in the bushing 32 as at 36 is large enough to permit the next alternate nut member 31 to incline an equal amount in the opposite direction; and in either position, the head 34 will be supported in an equalized condition in the enlarged portion 33 of the bushing in a manner that will be well understood.

Preferably, the bushings 32 are inserted in suitable bores molded in the rim 3 after the latter is completely formed.

Figure 5:
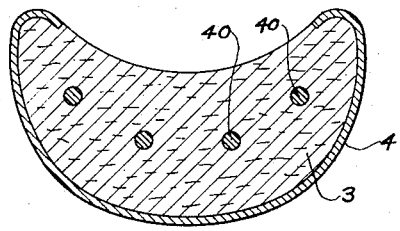
Fig. 5 is a view similar to Fig. 2, illustrating a type of rim reinforcement which may be applied to my invention.

In Fig. 5 I have illustrated a modified form of rim in which the rim 3 proper is reinforced by a plurality of rods or wires 40, generally of annular form, suitably spaced apart transversely of the rim. The reinforcement 40 may be placed in the mold prior to the filling of the same with the composition material and may be held in position relative to the sheath 4 during the molding process by any suitable means such as the employment of chaplets, not shown, but understood by those who practice this art.

The composition material hereinbefore referred to may be any composition material suitable for the purpose and made according to any suitable method or formula, and my invention is not limited to the employment of any particular composition. It is desirable, of course, as above stated, that the composition material be one which may, while in a plastic state, be placed in the mold containing the sheet metal sheath portion 4 and which may be caused to flow into all parts of the sheath to fill the same and around suitable core elements of the mold to provide the bores 7 and the like. Preferably, also, the composition material is one which, after being placed in the mold and subjected to pressure, will be held in molded shape by the metal sheath, whereby the sheath and the molded composition while still relatively plastic may be removed from the mold and allowed or caused to "set" out of the mold whereby the mold may be used in continuous production.

One such suitable composition material is that created by the chemical action of magnesium chloride and magnesium oxide when mixed with a base or foundation material such as sawdust or vegetable fiber or sand or other materials.

This composition may be made from 65% by weight of magnesium oxide and 35% by weight of wood sawdust, wood flour or the like, and rendering the same semi-fluid or plastic by adding thereto and mixing therewith concentrated solution of magnesium chloride, the proportion of the solution being determined by the degree of plasticity or fluidity desired for molding purposes to which the mixture is applied.

My invention is not limited to the particular embodiments thereof shown and described hereinbefore.

My invention is susceptible of various modifications other than those shown and all modifications and changes thereof, not departing from the spirit of my invention or sacrificing its advantages, are comprehended within the appended claims.

I claim:

1. A wheel rim construction comprising a sheet metal sheath annulus providing an annular cavity of substantial radial width and composition plastically molded by pressure and set therein to form a rim body annulus of substantial radial thickness.

2. A wheel rim construction comprising a sheet metal sheath annulus providing an annular outwardly radially open cavity and composition plastically molded by pressure and set therein to form a rim body annulus of substantial radial thickness.

3. A wheel rim construction as described in claim 2 and in which a plurality of wheel spoke nut receiving bores are molded in the body annulus, each extending generally radially entirely therethrough and aligned with corresponding perforations in the sheet metal annulus.

4. A wheel construction as described in claim 2 and in which the opposite outer annular edges of the sheet metal annulus are reentrant and partially enclose adjacent portions of the composition body annulus and between the opposite edges the composition annulus is provided with a pressure molded outwardly concave annular tire engageable surface.

5. A wheel rim construction as described in claim 2 and in which a plurality and in which a plurality of wheel-spoke-nut receiving stepped bores are molded in the body annulus each extending generally radially entirely therethrough and providing a pressure molded nut head receiving and nut head engageable shoulder at one end of the bore.

MAYO E. ROE.

CERTIFICATE OF CORRECTION.

Patent No. 1,938,862.  December 12, 1933.

MAYO E. ROE.

It is hereby certified that error appears in the printed specification of the above numbered patent requiring correction as follows: Page 2, after line 64, insert the following paragraphs—

Figure 6:
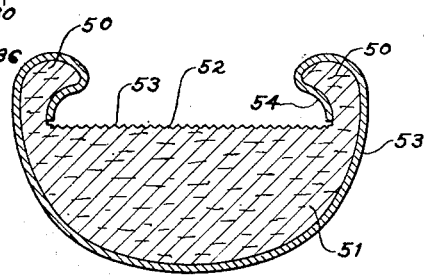
Fig. 6 is a view similar to Fig. 2 but illustrating my invention as applied to the so-called clincher type rim.
Figure 1:
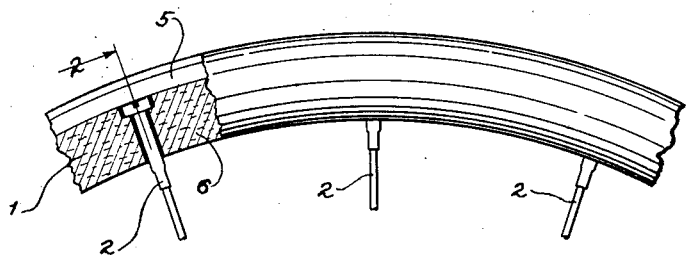
Fig. 1 is a fragmentary side elevational view of a wheel embodying my invention.

In Fig. 6 I have shown a modification in which the horn portions 50—50 of the generally crescent form cross-section of the rim extend upwardly over the tire-engaging portion 52 of the rim and the sheath 53 doubles back upon itself as at 54 to enclose the horns 50. The tire-engaging portion 52 in this form preferably in a plane but the surface 53 thereof may be corrugated or otherwise provided with a rough texture to more securely grip a tire when mounted thereon. The rim of the form shown in Fig. 6 is particularly adapted to have mounted thereon tires of the clincher type and may be referred to as a clincher rim. In this form, the horns 50 of the rim 51 are not only covered by the sheath 53—54 but are reinforced thereby.

The rim of my invention hereinbefore described, both in the method and depth of making the same and in the finished product, is entirely different from wheels that have heretofore been proposed such, for example, as wheels made of wood and sheathed with metal.

Wood rims sheathed with metal are expensive for several reasons among which are that the wood must in the first instance be particularly selected for the use and must be bent into the required shape and glued to maintain it in this bent state; and then must be turned in a lathe over all the surface thereof, an operation which must be usually performed by hand. Then the holes for the spokes must be drilled which involves additional hand labor, and after that the metal sheath must be spun on which is an operation that must usually be performed by hand. Furthermore, it is almost impossible to prevent the rim from changing its shape when applying a metal sheath due to the strain set up therein.

Furthermore, when it is desired to plate the metal sheath with nickel or chromium, this may be accomplished without difficulty with the rim of my invention, whereas to plate a sheath on a wooden rim introduces additional difficulties as is well understood by those skilled in the plating art.

And that the said Letters Patent should be read with this correction therein that the same may conform to the record of the case in the Patent Office.

Signed and sealed this 23rd day of January, A. D. 1934.

F. M. Hopkins
Acting Commissioner of Patents.

(Seal)